(12) United States Patent
Reichow et al.

(10) Patent No.: US 6,422,800 B1
(45) Date of Patent: Jul. 23, 2002

(54) ON-BOARD WEIGHING SYSTEM FOR FRONT LOADING REFUSE VEHICLES

(76) Inventors: Keith W. Reichow, 26409 148th Ave. SE., Kent, WA (US) 98042; Bill Zimmerman, 2344 N. 64th St., Seattle, WA (US) 98105

( * ) Notice: Subject to any disclaimer, the term of this patent is extended or adjusted under 35 U.S.C. 154(b) by 0 days.

(21) Appl. No.: 09/152,592

(22) Filed: Sep. 14, 1998

(51) Int. Cl.[7] .............................................. G01G 19/08
(52) U.S. Cl. ...................... 414/408; 177/136; 177/139; 414/21; 414/785; 187/237
(58) Field of Search ................................ 414/408, 407, 414/406, 21, 785; 177/136, 139, 145, 130; 187/237

(56) References Cited

U.S. PATENT DOCUMENTS

| | | | |
|---|---|---|---|
| 2,757,923 A | * 8/1956 | Lefsheik | ..................... 177/139 |
| 4,421,186 A | * 12/1983 | Bradley | .................... 414/21 X |
| 4,645,108 A | 2/1987 | Garbade et al. | |
| 4,714,122 A | * 12/1987 | Appleton et al. | ......... 414/21 X |
| 4,771,837 A | 9/1988 | Appleton et al. | |
| 4,921,059 A | * 5/1990 | Woodle et al. | .......... 177/136 X |
| 5,083,624 A | 1/1992 | Reichow | |
| 5,178,226 A | 1/1993 | Bowman et al. | |
| 5,209,312 A | 5/1993 | Jensen | |
| 5,209,313 A | 5/1993 | Broderick et al. | |
| 5,215,155 A | 6/1993 | Van der Velden | |
| 5,245,137 A | 9/1993 | Bowman et al. | |
| 5,285,020 A | 2/1994 | Jurca | |
| 5,837,945 A | 11/1998 | Cornwell et al. | |
| 5,861,580 A | * 1/1999 | Moore et al. | ................ 177/136 |
| 5,917,159 A | 6/1999 | Kostiuk | |
| 5,922,998 A | 7/1999 | Zefira | |

FOREIGN PATENT DOCUMENTS

| | | | |
|---|---|---|---|
| CA | 633548 | * 12/1961 | .................. 414/21 |
| CA | 2061276 | 9/1992 | |
| DE | 3542619 | * 6/1987 | .................. 414/21 |
| WO | 94/03784 | 2/1994 | |
| WO | 97/04289 | 2/1997 | |

OTHER PUBLICATIONS

"Route Man" front load scale system for Structural Instrumentation (Seattle, WA).
Mass Corporation front load scale system (Markham, ON).
"Strategy" front load scale system from Hardy Instruments (San Diego, CA.
"Load Man" front load sale system from Creative Microsystems, Inc. (Renton, WA).
LTS Scale front load scale system from Lift Truck Sales (Twinsburg, OH).

* cited by examiner

Primary Examiner—Frank E. Werner

(57) ABSTRACT

The system is for use in a front loader assembly for refuse vehicles, which include two spaced fork members which are secured to a cross-member, which in turn are supported by lift arms which move the load supported on the forks into the refuse truck. The system includes flexure beams which are formed by cutout portions in a sensing portion of each fork. The flexure beams are located symmetrically about a centerline of a sensing section of each fork, and alternate between two different lengths, with the flexure beams of each length being in alignment. Three sets of long cutout portions and 3 sets of short cutout portions are included, in addition to a central pair of cutout portions on which the strain gauges are mounted. The sensing section of the fork is configured to provide the necessary stiffness with the plurality of flexure beams therein.

17 Claims, 2 Drawing Sheets

ON-BOARD WEIGHING SYSTEM FOR FRONT LOADING REFUSE VEHICLES

TECHNICAL FIELD

This invention relates generally to on-board weighing systems for vehicles, and more particularly concerns an on-board weighing system for use with a front loader-type refuse vehicle.

BACKGROUND OF THE INVENTION

Front loader refuse vehicles are generally well known. In such refuse vehicles, a refuse container is lifted by a fork and lift arm arrangement from a position in front of the cab up over the cab of a truck, depositing the refuse in the container in a truck body portion located immediately to the rear of the cab.

As with many refuse vehicles, it is important to accurately ascertain the weight of each load of refuse so that the customer can be appropriately billed and so that the truck will not be overloaded. Historically, customers were billed by volume. Only recently have attempts been made to weigh refuse picked up and then to adjust service frequency and/or charges accordingly. Such on-board scale weighing systems, however, need to be accurate, durable and cost-effective. Sensors have been placed on various portions of the lift assembly and under the truck body. Some systems have been sufficiently accurate, but not very durable or too expensive, while others have been durable but not accurate enough for small pickup weights. Still others have been inexpensive but have lacked durability and accuracy.

It is desirable that the accuracy of such systems be within 20 pounds or 1% of the true pickup weight of the refuse. Some attempts have been made to improve accuracy by placing the sensors on the extending forks which go underneath the refuse containers for front loader vehicles. This is a generally desirable position, relative to accuracy, but the sensors are susceptible to damage when mounted on the forks and the weight recorded by such systems may depend on the position of the container on the forks. Correction of the output signal from the sensors to account for the differing sizes of the containers and the position of the containers on the forks is necessary in such cases.

Also, the forks themselves are often subject to extreme conditions of use which can negatively affect accuracy of weighing systems mounted thereon. For example, the forks themselves are often used to dislodge containers frozen to the ground, or to reposition a fully loaded container.

Hence, it remains a difficult challenge for a front loader weighing assembly to be highly accurate, consistent in results regardless of the position and/or size of the container, and sufficiently rugged to withstand the rigors of ordinary use.

DISCLOSURE OF THE INVENTION

Accordingly, the present invention is an on-board weighing system for front loading vehicles which includes: front loader assembly for vehicles, including two spaced fork members upon which the load to be weighed is positioned, the fork members being secured to a cross-member which is supported in the vicinity of the respective ends thereof by lift arms which are mounted on the vehicle and which move the load into the vehicle; and load sensor means for monitoring deflection in sensing sections in each fork, the sensing sections including a plurality of flexure means therein, the flexure means being staggered in length across the sensing section.

BEST MODE FOR CARRYING OUT THE INVENTION

Figure 1:
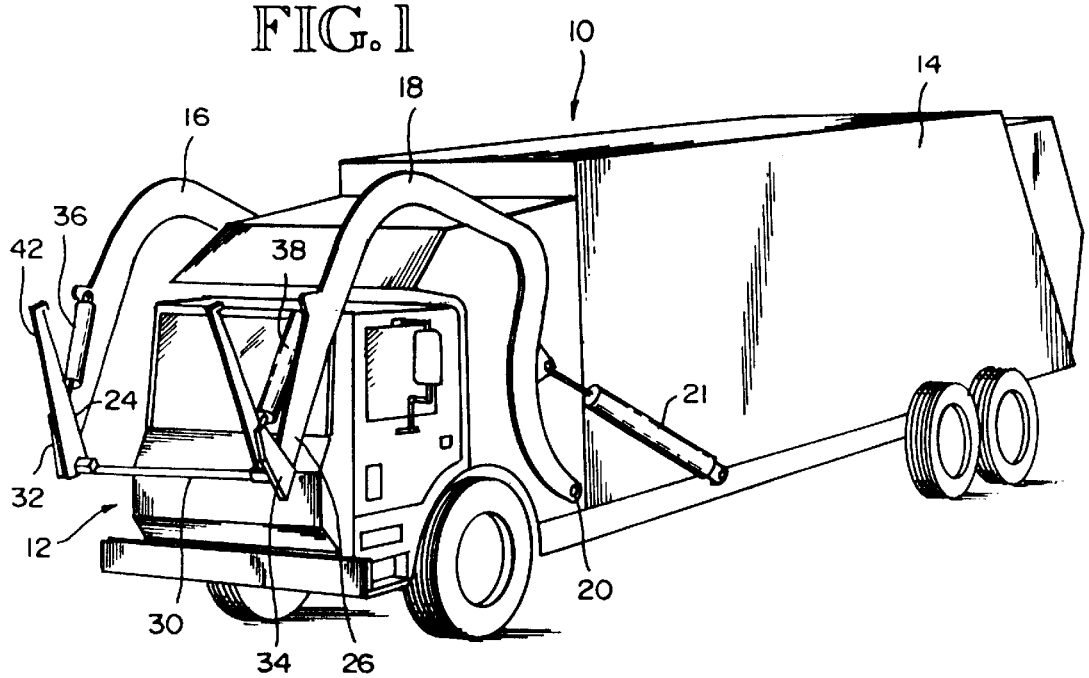
FIG. 1 is a perspective view showing a front loader refuse truck.

FIG. 1 shows what is known as a front loader refuse vehicle, generally at 10. The refuse vehicle includes a truck cab 12 with a truck body 14 behind the cab. The front loader lift assembly for refuse containers generally includes a pair of lift arms 16 and 18 positioned on either side of cab 10, movable about pivot points 20 located at the lower front ends of body 14. The movement of the lift arms is controlled by associated lift arm hydraulic cylinders 21.

Extending between the free front ends 24 and 26 of lift arms 16 and 18 is a horizontal cross-tube 30. Extending outwardly from the ends of cross-tube 30 are two short bracing elements 32 and 34 which are rigidly connected to the cross-tube so that rotation of the bracing elements rotates cross-tube 30 and any other elements attached thereto. Lift cylinders 36 and 38, respectively, extend between each lift arm and the bracing element adjacent the end of the lift arm. Extending outwardly and rigidly connected to the cross-tube 30, slightly inwardly from the two bracing elements, are a pair of front forks 40 and 42. Front forks 40 and 42 are elongated and may include a small upstanding hook-like portion at the free ends thereof.

All of the above elements are generally conventional for front loader refuse trucks, and therefore are not described in detail herein. In operation, the forks are rotated to a horizontal position by lift cylinders 36 and 38 and inserted into pockets on each side of the refuse container. Hydraulic cylinders 21 controlling lift arms 16 and 18 are then actuated, rotating the entire front loader assembly and the refuse containers about the lift arm pivot points 20, to the point where the refuse in the container is dumped into body 14. The lift arms 21 are then rotated back to their original position, with the forks 40, 42 in front of the cab in a horizontal position, at which point the vehicle is moved away, leaving the container on the ground. The forks may then be rotated upwardly to the position shown in FIG. 1 and the vehicle is then moved to the next container.

Figure 2:
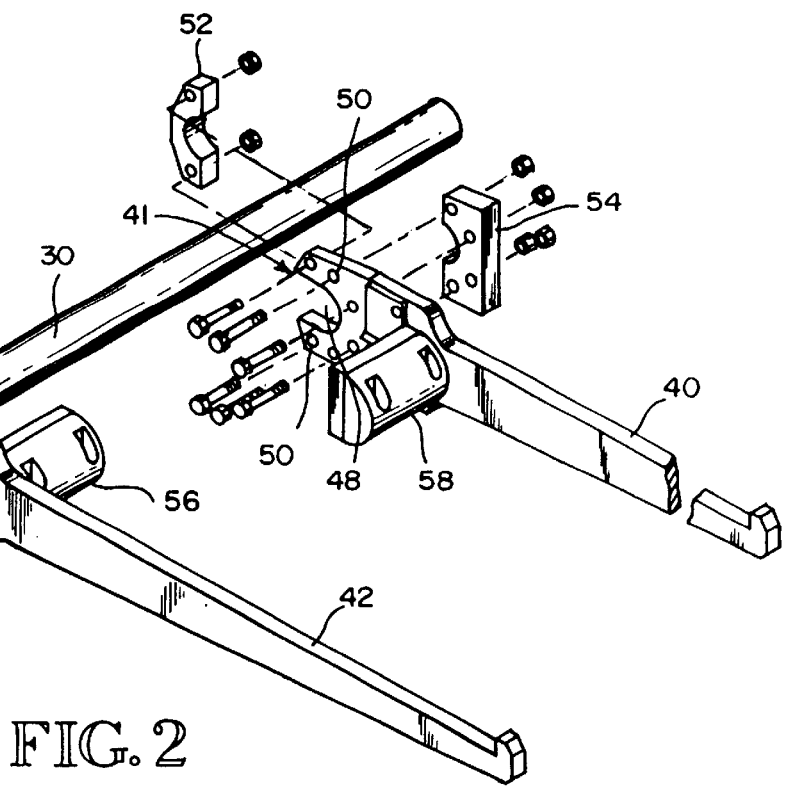
FIG. 2 is a partially exploded perspective view showing a portion of the front loader assembly of FIG. 1.

FIG. 2 shows in more detail the forks of the present invention and their connection to cross-tube 30. The proximal end 41 of fork 40 (the arrangement of fork 42 is identical) includes an elongated slot 48 which extends inwardly of fork 40 approximately five inches and into which cross-tube 30 fits. The inner end of slot 48 is curved to fit the cross-tube. A number of smaller openings 50—50 extend through the fork around the periphery of opening 48. Fork 40 is approximately 67 inches long and 1.5 inches thick in the embodiment shown.

The fork is attached to a mounting block assembly comprised of mating portions 52 and 54 by means of a plurality of bolts and nuts which extend through openings 50—50. Each mounting block portion is welded in the desired location to cross-tube 30. Individual bumper elements 56 and 58 are secured by screws or the like to mounting plates which are attached to the interior surfaces of each fork. Such a structure permits easy replacement of the fork by simply unbolting the damaged fork from the mounting block assembly and replacing the fork with a new one. The bumper elements can also be readily replaced if damaged or worn.

Figure 3:
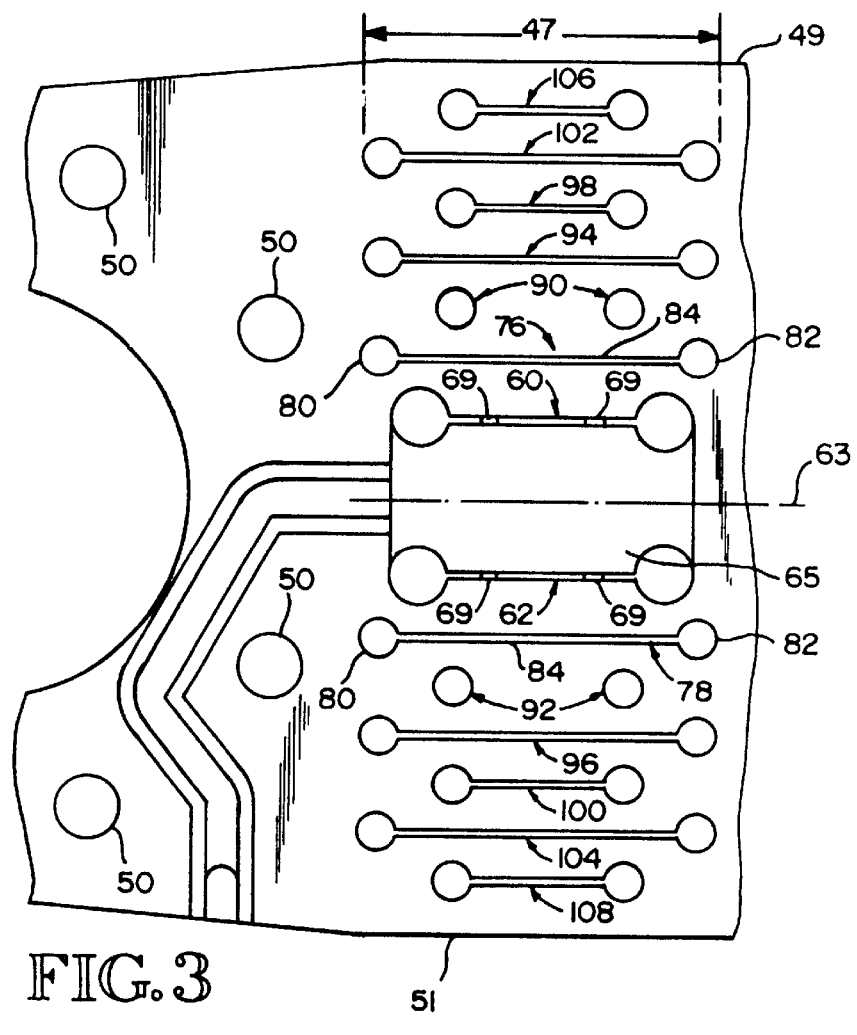
FIG. 3 is an elevational view showing the configuration of flexure areas and location of the strain gauges in one of the fork portions of the loader assembly of FIG. 1.
Figure 4:
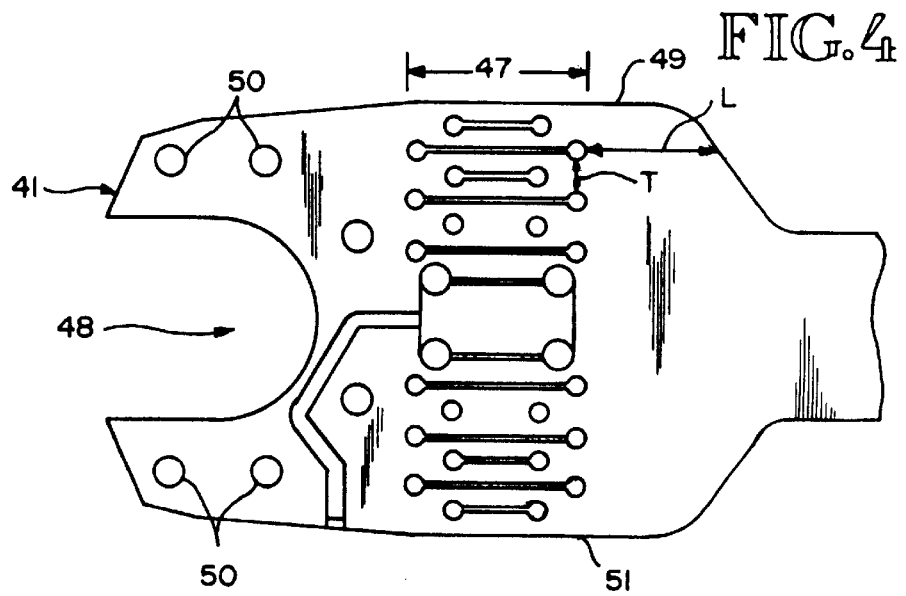
FIG. 4 is an elevational view showing another part of the fork portion of FIG. 3.

FIGS. 3 and 4 show a particular arrangement and location of strain gauges and flexure portions which have been discovered to provide the desired accuracy for the weighing system while maintaining necessary strength and ruggedness. Each fork includes a sensing or gauge section 47 near the proximal end 41 of the fork, approximately adjacent the cross-tube 30. In the sensing section 47 are located a plurality of cutout portions which form a plurality of individual flexure beams across the width (from top edge 49 to lower edge 51) of the fork.

The sensing section 47 designed to provide proper stiffness across the width of the section (vertically) that a high signal to noise ratio is obtained for deflection of the flexure beam material in the sensing section from the refuse container load. Also, there must be sufficient lateral stiffness in the sensing section so that the fork is resistant to damage from side loads. Lastly, the sensing section must be designed so that the signal output from the strain gauge sensors mounted in the sensing area is not significantly affected by location of the container on the forks or the size of the container.

The following design accomplishes the above objectives. Referring to FIG. 4, the respective top and bottom edges of each fork extend outwardly and slightly forwardly from the proximal end 41 of the fork (at opening 48) and then begin to curve slightly outwardly and forwardly, such that the width (from top to bottom) of the fork increases from approximately 4.6 inches to approximately 10 inches over a length of approximately seven inches, until the sensing section 47 is reached. The sensing section is approximately 10 inches wide in the embodiment shown, which is greater than for conventional forks at that point. This is necessary to maintain the required stiffness in the sensing section with the numerous flexure beams present therein. The flexure beams are all approximately 1.5 inches thick, except for the central flexure beam, which is approximately one inch thick.

Two central cutout portions 60 and 62 are located symmetrically about the centerline 63 of the sensing section 47 of the fork. In the embodiment shown, each cutout portion 60 and 62 includes two circular openings which extend through the fork, approximately 0.750 inches in diameter, with their center points being approximately 2.875 inches apart longitudinally. The two spaced openings of one cutout portion 60 are in vertical alignment with the openings of cutout portion 62. Extending between the two openings of each cutout portion is a narrow slot, approximately 0.006 inches wide. The material between the two cutout portions 60 and 62 forms the central flexure beam 65.

Additional cutout portion pairs are located symmetrically about the cutout portions 60 and 62 and the centerline of the sensing section.

A first pair of additional cutout portions 76 and 78 each comprise a pair of openings 80 and 82, connected by a small slot 84, all extending completely through the fork. In the embodiment shown, the openings in cutout portions 76 and 78 are 0.44 inches in diameter, with the center of the openings separated by a distance of 3.75 inches longitudinally of the fork. The openings at the opposing ends of the two cutout portions are also aligned vertically, separated by 3.19 inches between their center points. Slot 84 is 0.06 inches wide. Cutout portions 76 and 78 are "nested" relative to cutout portions 60 and 62, with the ends of cutout portions 76 and 78 being equidistant from the end points of cutout portions 60 and 62. Additional flexure beams in the sensing section of the fork are formed between cutout portions 76 and 78 and cutout portions 60 and 62, respectively.

The next pair of cutout portions are defined by a pair of spaced openings 90 and 92, respectively, without, however, a connecting slot. The center points of the openings 90 and 92 are separated longitudinally by a distance of 2.0 inches and laterally by a distance of 4.33 inches. The openings 90 and 92 of one cutout portion are in vertical alignment with the corresponding openings in the other cutout portion. Although the pairs of openings 90 and 92 do not have connecting slots, it is not necessary that the slots be absent, i.e. the openings could be connected by a slot. Openings 90 and 92 are equally inboard, respectively of the openings of the cutout portions 76 and 78 Cutout portions 94 and 96 are coextensive and identical to cutout portions 76 and 78 with the center lines of the spaced openings of cutout portions 94 and 96 being separated laterally by a distance of 5.46 inches. The next pair of cutout portions 98 and 100 are similar to and are coextensive with cutout portions 90 and 92, with the exception that cutout portions 98 and 100 each comprise a pair of spaced openings connected by a narrow slot (0.06 inches wide) The centerlines of cutout portions 98 and 100 are separated laterally by a distance of 6.59 inches. The next pair of cutout portions 102 and 104 are again similar to and coextensive with cutout portions 76 and 78 and 94 and 96, with the centerlines separated laterally by a distance of 7.73 inches. The last pair of cutout portions in the embodiment shown are 106 and 108, which are similar to and coextensive with cutout portions 90 and 92 and 98 and 100, except that the center lines thereof are separated laterally by a distance of 8.86 inches.

Hence, in the embodiment shown, longer cutout portions, each approximately 3.75 inches long, pair alternately with shorter cutout portions, each approximately 2.0 inches long, with one shorter cutout portion having no connecting slot. Each of the end openings for the cutout portions has a diameter of 0.44 inches, and the narrow connecting slot (when present) is 0.06 inches wide. These dimensions may be varied to some extent.

Flexure beams are formed between adjacent cutout portions across the width of the fork. The shorter cutout portions are aligned vertically with each other, as are the longer cutout portions. The two lengths of cutout portions alternate symmetrically about the centerline of the sensing section of the fork, with the ends of the shorter cutout portions being equidistant from the ends of the larger cutout portions, providing a "nesting" effect for the alternating cutout portions.

In the embodiment shown, conventional strain gauges 69—69 are mounted on the central flexure beam 65. The gauges measure the deflection of the central flexure beam 65 formed between the two cutout portions 76 and 78. The gauges could, however, be located on other flexure beams. The output of the gauges are connected into a conventional bridge arrangement, the output of which is directed to conventional electronics which produces an indication of load weight. These elements are well-known and are hence not described in detail.

Referring again to FIG. 3, the arrangement of the cutout sections is such that they alternate in length; i.e. they are all not in vertical alignment, although each "set" of cutout sections, i.e. the longer ones and the shorter ones, are themselves in vertical alignment.

The large number of cutout portions results in a large number of flexure beams across the width of each fork. In order to maintain good moment balance, the end support of all the flexure beams must be relatively stiff. In the sensing section, the end support stiffness ratio, i.e. the horizontal distance "L" in FIG. 3 from the ends of the cutout sections to the edge of the support area in the fork relative to the width of the flexure beam "T" in FIG. 3, must be greater than 2.5 and preferably in the range of 4 to 10. The flexure beam width "T" could be between adjacent cutout portions or between adjacent cutout portions which are in alignment.

An additional characteristic of the weighing assembly is that the individual flexure beams are an integral part of the fork itself, i.e. the flexure beams and the fork are a single, unitary member. However, a gauged flexure beam could be inserted into the sensing section.

Hence, an on-board weighing system for front loader refuse vehicles has been disclosed in which the strain sensors are located on flexure beams formed in the sensing sections in forks and wherein the cutout portions in the sensing region defining the flexure beams are arranged and configured to provide accuracy (within 20 lb. Of the pickup weight), with good moment balance, such that the weight measurement is not significantly affected by the position and/or size of the refuse container on the forks.

Although a preferred embodiment of the invention has been disclosed herein for illustration, it should be understood that various changes, modifications and substitutions may be incorporated in such embodiment without departing from the spirit of the invention, which is defined by the claims as follows.

What is claimed is:

1. An assembly for use in an on-board weighing system for front loading vehicles having a front loader assembly, comprising:
   two spaced fork members upon which a load to be weighed is received, the fork members being secured to a cross-member which is supported in the vicinity of the respective ends thereof by lift arm portions of the front loader assembly which are mounted on the vehicle and which move the load into the vehicle action of a motive means for lifting said lift arm portions; and
   load sensor means positioned on the fork members for monitoring deflection in sensing sections in each fork member, the sensing sections each including a plurality of overlapping, parallel flexure beams, defined by closed slots in the sensing sections, located above and below a centerline of the sensing section in each fork member.

2. A system of claim 1, wherein the flexure beams are defined by cutout portions in the sensing section.

3. A system of claim 2, wherein each cutout portion includes a pair of spaced openings.

4. A system of claim 3, wherein the spaced openings of most of the cutout portions are connected by a narrow slot.

5. A system of claim 1, wherein the sensing section of each fork is located near a proximal end thereof, substantially adjacent to the cross-member.

6. A system of claim 1, wherein the plurality of flexure beams alternate between longer and shorter flexure beams.

7. A system of claim 6, wherein the longer beams are in alignment and the shorter beams are in alignment, respectively.

8. A system of claim 1, including at least three flexure beams located on both sides of the centerline of the sensing section.

9. A system of claim 1, wherein the forks are removably secured to the cross-member.

10. A system of claim 1, wherein the flexure beams are staggered in position across the sensing section.

11. A system of claim 1, wherein the flexure beams are located symmetrically about the centerline in each sensing section.

12. An assembly for use in an on-board weighing system for front loading vehicles, comprising:
   two spaced fork members upon which a load to be weighed is received, the fork members being secured to a cross-member which is supported in the vicinity of the respective ends thereof by lift arms which are mounted on the vehicle and which move the load into the vehicle by action of a motive means for lifting the lift arms; and
   load sensor means positioned on the fork members for monitoring deflection in sensing sections in each fork member, the sensing sections each including a plurality of parallel flexure beams therein defined by closed slots in the sensing sections, the flexure beams having an end support stiffness ratio of at least 2.5.

13. A system of claim 12, wherein the end support stiffness ratio is within the range of 4 to 10.

14. A system of claim 12, wherein the flexure beams are defined by cutout portions in the sensing section.

15. A system of claim 12, wherein the flexure beams in each fork are located symmetrically about the centerline of the sensing section thereof.

16. A system of claim 15, wherein the plurality of flexure beams alternate between longer and shorter flexure beams.

17. A system of claim 16, wherein the longer beams are in alignment and the shorter beams are in alignment, respectively.

* * * * *